United States Patent [19]

Rosenlund

[11] 3,872,667
[45] Mar. 25, 1975

[54] THERMAL-EXHAUST GAS REACTOR

[75] Inventor: Iver Theodore Rosenlund, Kenneth Square, Pa.

[73] Assignee: E. I. du Pont de Nemours and Company, Wilmington, Del.

[22] Filed: Feb. 14, 1973

[21] Appl. No.: 332,505

[52] U.S. Cl. .................. 60/282, 23/277 C, 60/306, 60/323
[51] Int. Cl. ............................................ F01n 3/10
[58] Field of Search ............ 60/282, 323, 302, 303, 60/304, 305, 306; 23/277 C, 288 F

[56] References Cited
UNITED STATES PATENTS

| | | | |
|---|---|---|---|
| 939,844 | 11/1909 | Lehmann | 60/306 |
| 3,066,755 | 12/1962 | Diehl | 60/303 |
| 3,166,895 | 1/1965 | Slayter | 60/304 |
| 3,210,161 | 10/1965 | Soltau | 60/303 |
| 3,254,963 | 6/1966 | Leistritz | 60/303 |
| 3,413,803 | 12/1968 | Rosenlund | 60/282 |
| 3,633,368 | 1/1972 | Rosenlund | 60/282 |

*Primary Examiner*—Douglas Hart
*Attorney, Agent, or Firm*—James A. Costello

[57] ABSTRACT

Disclosed herein is a thermal reactor to promote the reaction of hot internal combustion engine exhaust gas with air which comprises an elongated reactor chamber having means for introducing air, means for introducing exhaust gas and means for exiting chamber reaction products.

4 Claims, 13 Drawing Figures

3,872,667

THERMAL-EXHAUST GAS REACTOR

BACKGROUND OF THE INVENTION

1. Field of the Invention

This invention concerns a reactor wherein the exhaust gas from one or more cylinders of an internal combustion engine is reacted thermally with air from an auxiliary air supply.

2. Description of the Prior Art

Thermal systems to reduce the hydrocarbon and carbon monoxide content of hot exhaust gas from internal combustion engines by further reaction with air are known. However, such systems mix exhaust gas with supplementary air either at the exhaust ports or in the exhaust manifold. Reactors to conserve the high temperatures of these mixtures employ rather complex systems using baffles, radiation deflector shields and multiple, often restricted, concentric annuli which extend internal gas flowpaths. In use, such reactors can reach very high reactor core temperatures, for instance in the 2,000° to 2,250°F. range, and these high temperatures often result in core breakdown.

Under certain engine operating conditions, e.g., extending idling, some prior art reactors are less effective than desired because hot air-exhaust gas mixtures passed into the reactors are cooled by prolonged contact with reaction chamber walls and their reaction is slowed by relative wall chill. As a result, there is insufficient lowering of hydrocarbon and carbon monoxide content of the exhaust gas.

SUMMARY OF THE INVENTION

This invention concerns an improvement in a thermal exhaust gas reactor comprising an elongated reactor chamber having walls, ends and a longitudinal axis, and an outer shell enclosing the reactor chamber and separated therefrom by an insulation space, the reactor chamber being enclosed except for exhaust gas inlets, and a reaction-product outlet, the improvement which comprises i. air inlets separate from the exhaust gas inlets which air inlets promote diffusion of incoming air into incoming exhaust gas, and ii. exhaust gas inlets designed to form exhaust gas streams having a high surface to volume ratio for contacting air introduced through the air inlets.

This invention promotes the initial mixing of air and exhaust gas by interdiffusion between them rather than by turbulent mixing. The invention as described avoids quenching the reaction by chilling or upsetting the stoichiometry of the reaction mixture.

It should be understood that there can be one or more air inlets, exhausts gas inlets and reaction-product outlets. All exhaust gas inlet openings have shapes which insure introduction of gas streams therethrough having a high surface to volume ratio. Gas streams of high surface to volume ratio maximize the diffusion rate of the streams into the air introduced. At the same time, inlet openings are pointed in a direction which avoids scrubbing chamber walls, avoids too-rapid-cooling of the exhaust gases and avoids degradation of the chamber walls by the hot exhaust gases. The direction in which the exhaust gas inlets are pointed can approach 90° from the chamber axis when the chamber is large enough. However for best results, for instance with a reactor such as is depicted in FIG. 1, it has been found that angles between the exhaust gas inlets and the (imaginary) horizontal chamber axis should be between about 0° to 60°, with 20° to 40° being preferred, and about 30° being most preferred.

The air inlets are preferably located at one or both chamber end(s). Although the oxidizing gas reactant is spoken of herein as being air, it can be oxygen or any oxidizing combination of gases. The air (oxidizing gas) is introduced at the inlets in readily diffusable streams to preclude the possibility of any reaction quenches.

The reactor chamber can serve any number of power-producing engine chambers, e.g., single cylinder displacements, and can have one or more exhaust gas inlets each serving one or more such power-producing chambers. In reciprocating engines the reactor chamber will preferably have two and most preferably four exhaust gas inlets. Each inlet has one or more openings into the chamber having a p/a ratio of at least 3, wherein $p$ is the total inches perimeter of the inlet opening(s) and $a$ is the total square inch area of the opening(s). Preferably, the ratio is at least 4 and as high as 10 or 15, and is limited only by space considerations.

One contemplated configuration for an exhaust gas inlet is a pipe closed at the end which extends into the reactor chamber except for an axial slot in, or extending from, the end. The pipe can have various configurations of guide vanes therein. For instance, the guide vanes can be flush with the axial slot. One or more of the vanes can be positioned to vary the direction of the outcoming flow of exhaust gas.

Although not necessary, it is preferred that the exhaust gas be premixed with air before introduction into the reactor chamber and before reaction with the air that is introduced via the air inlets. For simplicity, "exhaust gas" will refer to exhaust gas with or without premixed air that enters the reactor through the exhaust gas inlets.

It has been found that the novel thermal exhaust gas reactor having a single reaction chamber and auxiliary air feed reduces the hydrocarbon and carbon monoxide emissions of a feed of air-exhaust gas mixture as much or more than reactors which treat such a feed without providing auxiliary air. Furthermore, the reactor promotes reactions at temperatures which are 100° to 250°F. lower than those developed in other effective reactors, thus enabling extended reactor life.

BRIEF DESCRIPTIONS OF THE DRAWINGS

Figure 1:
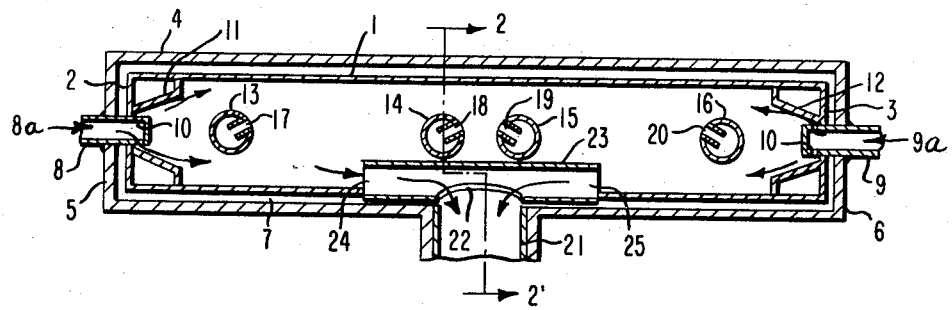
FIG. 1 is a side view along the longitudinal planar axis of a reactor embodiment.

In the reactor of FIG. 1 elongated cylindrical reactor chamber 1 has closures 2 and 3 at its ends. They are positioned inside shell 4, also having closures 5 and 6. Shell 4 and closures 5 and 6 enclose air space 7 between them and chamber 1 which is closed by closures 2 and 3. Pins (air inlets) 8 and 9 are oriented along the general axis of chamber 1 and shell 4. Preferably, pins 8 and 9 are sealably fixed in closures 5 and 6, and slidably positioned inside closures 2 and 3. It is contemplated, however, that the pins can be sealably fixed in closures 2 and 3 and slidably positioned inside closures 5 and 6. In this embodiment, air is introduced through supporting pins 8 and 9 although supporting pins and air inlets can be separate, if desired. Pins 8 and 9 have passages 8a and 9a in them in communication with radial holes 10 in the pins. Around pins 8 and 9 are conical guides 11 and 12 extending to the chamber walls to disperse introduced air as a flow from holes 10 in air inlet pins 8 and 9 toward and along the chamber wall. For additional details concerning placement of supporting pins see my coassigned application filed concurrently herewith, entitled "Exhaust Gas Reactor Supporting Pins", bearing Ser. No. 332,504.

Figure 2:
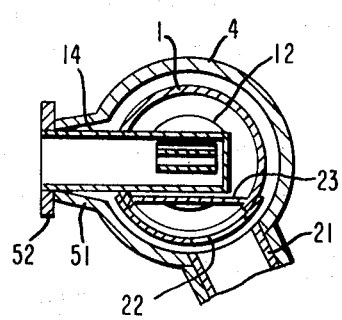
FIG. 2 is a view of the reactor through cross-section 2-2' of FIG. 1.

Exhaust pipes 13, 14, 15 and 16 extend through shell 4 and into chamber 1 across the chamber axis, as shown in FIG. 2. The pipes have openings 17, 18, 19 and 20 into chamber 1 communicating with their exhaust gas feed inlets outside shell 4 typified in FIG. 2. Each pipe is enclosed by a typical shell extension 51 having typical attachment flange 52 which provides an extension of air space 7.

Openings 17 and 18 are positioned to emit exhaust gas as a thin sheet toward holes 10 at pin 9, and openings 19 and 20 are positioneod to emit exhaust gas toward holes 10 of pin 8. Openings 17, 18, 19 and 20 are also positioned to emit in a direction along the chamber axis but away from the chamber outlet to avoid the direct exit from chamber 1 of emitted exhaust gas while also avoiding scrubbing of chamber wall.

Exit pipe 21 welded to the shell 4 registers with outlet hole 22 in chamber 1. Barrier 23 forms a wall chordwise across chamber 1, leaves communication of openings 24 and 25 at its extremities with hole 22 and has enough length to delay the exit of mixtures of auxiliary air and exhaust gases through hole 22.

Figure 3:
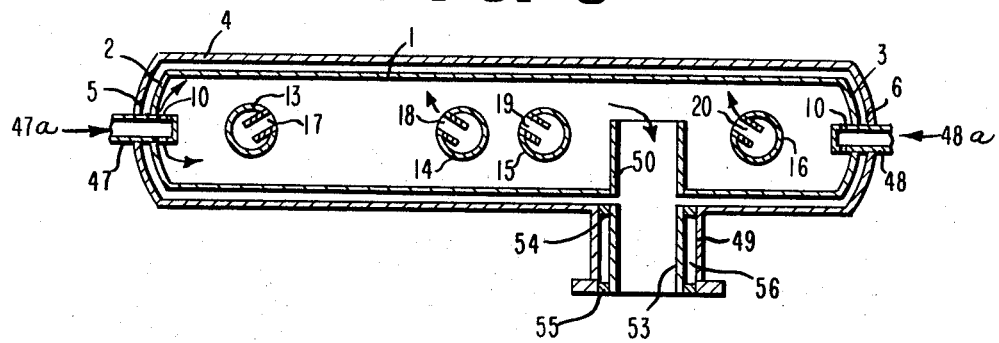
FIG. 3 illustrates another reactor embodiment.

In the embodiment of FIG. 3, pins 47 and 48 also have passages 47a and 48a communicating with radial holes 10, are fixed in closures 5 and 6 and have axial freedom in closures 2 and 3 to allow closures 2 and 3 to slide when temperature changes in the reactor cause different length changes of shell 4 and chamber 1. Exit pipe 50, extending into chamber 1 to a position and distance from the chamber wall which prevents direct exit of gas from the chamber, is flush with the outside of chamber 1. Exit pipe extension 53 is enclosed by pipe 49 and is in line with pipe 50. Spacer rings 54 and 55 between pipes 49 and 53 maintain an air space. Pipe 53 directs the reacted gases to the exhausst pipe of the engine.

When inner exhaust pipes 15 and 16 are far enough apart exit pipe 50 can be between them, in alignment with pipe 53, and can be extended across the chamber axis to a position facing the chamber wall a distance from it that prevents direct gas exit.

Figure 4:
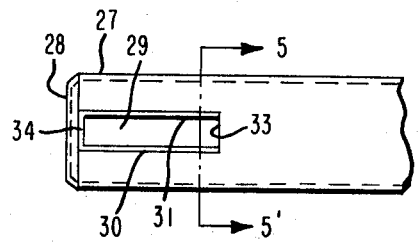
FIG. 4 shows a view along the axis of the preferred embodiment of an exhaust gas inlet duct.
Figure 5:
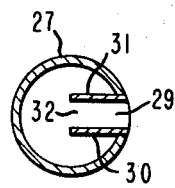
FIG. 5 is a cross section of the inlet duct of FIG. 4 at section 5-5'.

FIGS. 4 and 5 show a preferred exhaust gas inlet pipe in a reactor of this invention. Pipe 27 has a specially constructed exit into the reactor chamber. End 28 blocks axial flow in the pipe. Axially extending opening 29 provides the gas exit across the pipe axis. Vanes 30 and 31 together with base vane 34 block axial flow within the pipe and redirect the flow through opening 29 in the pipe periphery. In the drawing, vanes 30, 31 and 34 are bent from a single strip to form gaps 29 and 32 at the sides and gap 33 at the open end of the resulting U.

Figure 10:
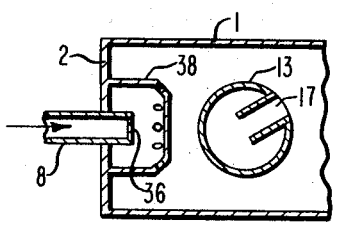
Figure 11:
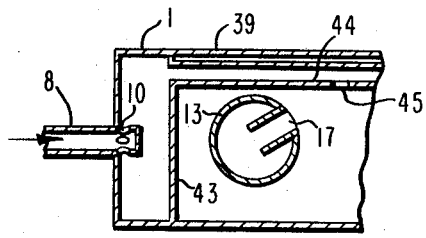
Figure 12:
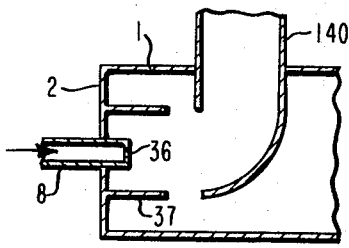
Figure 13:
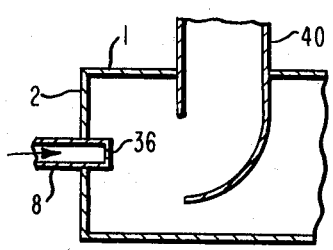

FIGS. 6 through 13 show variations in the reactor embodiment of FIGS. 1 and 2. Air entry can be provided directly at axial hole 36, as in FIGS. 6, 8, 12 and 13. The auxiliary air flow is a fraction of the exhaust gas-supplementary air mixture supplied to the reactor through its exhaust gas pipes. The air entry can be means to introduce auxiliary air in thin streams, such as by providing cup 37 to direct the streams away from chamber ends, as in FIGS. 8 and 12, or by providing means to convert the air to a multiplicity of fine jets, as in FIGS. 9, 10 and 11, with air jet reformers 38 and 39. Reformer 39 is an axially extending air carrier tube with typical tube opening 45 opposite opening 17. FIGS. 12 and 13 illustrate a useful arrangement of exhaust gas pipe 40 against a cushion of incoming air. Exhaust gas pipes can have back openings, such as opening 41 in pipe 42 of FIG. 8, so that while the main direction of exhaust gas input by the pipe is toward a zone of air introduction at the farther end of chamber 1, some back flow toward another zone of air introduction also occurs.

In FIG. 11, an air plenum chamber exists between closure 2 and plenum plate 43 which communicates through air carrier tube 44 with the reactor chamber through tube opening 45 opposite opening 17. This arrangement of tube opening opposite a pipe opening is repeated for each pipe opening into the reactor.

As shown especially in FIGS. 7 to 11, means to introduce air as readily diffusable streams are particularly beneficial to the reaction in the reactor. Air supplied in turbulent form or from narrow holes or slots is less likely to produce even momentary tiny reaction quenches. Such means can include devices to squirt air through a narrow space to limit at least one dimension across the squirt, such as through fine holes or thin slots, or to drag on the side of squirted air to create turbulence in the air, preferably, to direct air along an air spreading surface, such as a chamber end, chamber wall or conical air guide.

DETAILS OF THE INVENTION

The reactor of FIG. 1 works as follows. The reactor, typically mounted on a 4-cylinder exhaust bank of a V-8 internal combustion engine, is provided by engine operation with patterned intermittent injections of mixtures of exhaust gas and supplementary air from engine exhaust ports produced in known manner. The injections are as hot or hotter than the exhaust gas emitted through engine exhaust ports because the supplementary air has reacted with exhaust gas to some extent before the mixture enters the reactor chamber.

The injections are directed from openings 17, 18, 19 and 20 into chamber 1. At the same time, auxiliary air is continuously pumped in through passages 8a and 9a through openings 10 of pins 8 and 9 as thin streams which diffuse inside the chamber.

Injections from openings 17 and 18 are directed toward an air flow originating at pin 9 and injections from openings 19 and 20 are directed toward an air flow originating at pin 8. At the same time, each injection is directed on the side of the baffle which creates the longer path before it exits through hole 22 and increases the opportunity of each injection of gas to react with air. Turbulence and mixing of the injection with the introduced auxiliary air occurs substantially without chill by the chamber wall. The auxiliary air provides a higher concentration of air effective for further emissions reduction. Together the mixed flows move toward openings 24 and 24 while their reaction continues, and thereafter they exhaust through hole 22. During their movement in chamber 1, their temperature remains high, at least 1,400°F., preferably 1,600°F., because of the heat liberated in the auxiliary air oxidation of carbon monoxide and hydrocarbons still present in significant concentrations.

During engine warmup, gas temperatures in chamber 1 peak at 1,800° to 1,950°F., usually not above 1,875°, and these temperatures settle down to 1,600° to 1,700°F. under engine cruise conditions. These temperatures apply particularly to reactor (A) described more fully below in the section "Description of the Preferred embodiments."

REACTOR SHAPE AND SIZE

The reactor chambers of these reactors can be circular, square, oval, rectangular, L-shaped or they can be of any other cross-sectional shape adapted to serve reciprocating or rotary internal combustion engines in available spaces. Preferably, they are cylindrical with circular cross-section.

The internal volume of the reactor chamber, ignoring the volume of inlet ducts present, is at least 3 times and as much as 15 times the displacement of one power-producing chamber served by the reactor. In general, performance improvement results from increasing chamber volume. In a conventional reciprocating engine a piston displacement is the power-producing displacement basis and in a rotary engine, such as a Wankel engine with a three- or four-lobe rotor, the volume change with compression against a single rotor face is the power-producing displacement basis.

The exhaust gas inlet duct can be any kind which can direct exhaust gas into the chamber interior in a controlled direction. Preferably, it directs thin sheets or streams of exhaust gas which are readily diffusible in the chamber. It can be a pipe having an ell opening into the chamber as in FIGS. 12 and 13 or a pipe having an elongated opening or a series of holes along the pipe axis, or preferably a pipe having an internal structure which redirects gas flow in the pipe from axial to cross-axial flow. It is mounted in the chamber so that its outlet directs exhaust gas into air flowing from the air introducing means, preferably in a direction which causes delay of its passage to the chamber outlet and encourages interdiffusion with the air.

The direction of initial exhaust gas flow is selected according to the influence on the gas flow pattern through the chamber by other considerations in the chamber, such as the location of the exit hole, the air present along the flow path and the expected velocity of exhaust gas into the chamber. The exhaust gas can be flowed directly opposite air introduction, as in FIGS. 12 and 13. The outlet area of each inlet duct into the chamber is 50 to 150 percent, preferably 80 to 120 percent, of the internal duct cross-sectional area.

A preferred inlet duct has structure typified by FIGS. 4 and 5. Duct 27 is closed across one end and has an axial slot extending from the closed end. It has internal guide vanes 30 and 31 flush with the axial slot and substantially parallel to a plane between them which includes the duct axis. The duct axis should be centrally located. The vanes should clear the other side of the duct to allow ready access of gases in the duct to space between the vanes, usually providing clearance areas between them and the other side, in combination with area across open space 33 between the vane ends, which is 50–150 percent, preferably 80–120 percent, of the internal duct cross section area. Clearance areas are the product of average minimum clearance and the distance over which the clearance exists. Base vane 34 positioned to redirect an axial gas flow to a cross axial gas flow is also present, and can be inherent in the duct closure or provided additionally as shown. Special advantages of this duct include its ease of fabrication, long service life, adaptation to simple reactor assembly procedures and ability to eject a thin exhaust gas stream.

Outlets from the reactor chambers should be large enough to release reaction products and to avoid an undue increase in exhaust back pressures. The remaining path to the atmosphere determines the needed size of reactor chamber outlets.

Flow path extending means can be incorporated inside the reactor chamber to delay the exit of the auxiliary air-exhaust gas mixture to the outlet. FIGS. 1 and 3 illustrate two such means. They should have a cross-section, for flow accommodation, which is at least equal to the cross-sectional area of one duct. Entrance to such means past nearby shell surfaces should have a clearance area which is at least 50 percent, preferably at least 200 percent, of the area of the chamber outlet opening.

Heat loss in this reactor can be minimized with insulation, e.g., fibrous ceramic insulation available for this use. Alternatively or additionally, a dead air space can be created inside or outside the reactor shell or a radiation-reflective metal liner can be used to conserve heat. Improved reactor performance results from the lowered reactor heat loss.

These reactors cooperate with means to deliver auxiliary air. The amount of air delivered should be sufficient for rapid reaction with hydrocarbons and carbon monoxide, while being insufficient to quench the reaction by its cooling effect. Engine-driven positive displacement air pumps normally used on automobile engines can be used. A typical air pump used to deliver air to exhaust ports is one provided by the manufacturer with a Chevrolet 350 cubic inch displacement engine. At atmospheric pressure, it delivers 177–183 lb. of air per hour at 2,000 engine rpm, 85–95 lb. per hour at 1,000 engine rpm.

When a single pump provides auxiliary air as well as air that is premixed with the exhaust gases before inlet into the reactor chamber, the pump is arranged so that 15 to 50 percent, preferably 15 to 25 percent, of its output provides auxiliary air to the reactor while the rest of its output is mixed with the exhaust gases at the engine valve ports. A reactor can be expected to provide optimum performance if the air pump used is designed to modulate air delivery in response to engine operating parameters other than or in addition to engine speed, e.g., manifold pressure or venturi vacuum.

MATERIALS OF CONSTRUCTION

The outer shells of the novel reactors are made of heat resistant materials. Other parts of the reactor are made of any heat resistant material adaptable to high temperature use in an oxidizing environment. The reaction chamber, as well as the inlet ducts and insulating liners, should be made of material that withstands hot, corrosive atmospheres arising within the reactor.

Chromium-nickel steels having 18 to 25 weight percent chromium and 8 to 32 weight percent nickel show excellent durability in this reactor. Especially effective are type 310 stainless steel, containing 25% Cr and 20% Ni, Incoloy 800, containing 20% Cr and 32% Ni and Incoloy 601, containing 60% Ni, 23% Cr, 14% Fe, 1.3% Al plus impurities. These materials are especially well suited to serve as chamber walls, end plates and insulation - spaced liners and sheaths. Also useful are iron-chromium-aluminum steels containing 12 to 18 weight % Cr and at least one other alloying element selected from 0 to 5.7% Al and 0 to 3% Si. Exemplifying these steels are alloy OR-1, containing 12% Cr and 3% Al; alloy 18-2-1, containing 18% Cr, 2% Al and 1% Si; alloy 14Si, containing 14% Cr and 3% Si; alloy 809-2, containing 12.5% Cr and 5.7% Al; and alloy 805-2, containing 13.7% Cr, 2.7% Al and 2.5% Si. Satisfactory performance of somewhat less corrosion resistant alloys can be expected because reactors of this invention develop lower gas temperatures.

DESCRIPTION OF THE PREFERRED EMBODIMENTS

METHODS OF CONSTRUCTION

The novel reactors are readily fabricated and assembled by conventional metal working techniques. Components of these reactors can be fabricated by forging, rolling, casting, grinding or any other means commonly used to provide the desired shapes and strength in use. Suitable thicknesses for most parts of these reactors range from 10 to 200, preferably 25 to 125 thousandths of an inch. Parts can be connected together and held by welds, rivets, bolts, pins, clips or any other art-recognized fastening techniques.

A typical reactor, designated (A), generally of the FIG. 1 embodiment, was made as follows:

A 19 inch reactor chamber tube of 3¾ inch O.D. by 0.062 inch 310 stainless steel was fabricated with a line of four 1.32 inch holes along its axis 1.66 inch and 6.77 inch from its midpoint. A flat baffle of 0.062 inch 310 SS was welded chordwise across the tube 13/16 inch from its axis in a plane parallel to that defined by the tube axis and the line of hole centers for a distance of 4¼ inches both ways from the tube midpoint, this after removing tube material to accommodate the welding. A curved patch of 0.062 inch 310 SS was fabricated and sealably welded to the tube, substituting for removed tube material. A 2¼ inch diameter exit hole was made in the patch about 105° away from the tube holes line.

Circular chamber plates, 3¾ inch diameter, of 0.062 inch 310 SS having central 0.505 inch diameter central holes were fabricated. Frustums of cones of 0.040 inch 310 SS having a maximum diameter equal to that of the reactor tube I.D. were secured at their 1 inch diameter ends coaxially with the plates. These plates were flush welded at the chamber tube ends with the maximum conical diameter inside the tube.

A concentric 19½ inch long shell tube of 0.062 inch 310 SS and appropriate diameter was lined inside with two concentric 0.030 inch 310 SS tubes radially spaced ⅛ inch apart, one 0.050 inch from the outer tube and the other of inside radius ⅛ inch greater than the reactor chamber tube. This subassembly was provided with end flanges and then was fitted concentrically over the reactor chamber tube after providing ¼ inch larger diameter holes in it for alignment with inlet tube holes and the exit hole.

Circular shell end plates, having a diameter matching the end flanges on the shell tube and ahving central ½ inch holes, were fabricated of 0.062 inch 310 SS. Into each plate, a 2 inch long, ½ inch diameter pin having a central ⅜ inch diameter passage and near one end having four radial ⅛ inch diameter holes communicating with the passage is welded so that the radial holes are ½ inch from the plate. These shell end plates are then secured to the outer tube with their central pins extending through the central holes of the chamber plates far enough for the radial pin holes to be in the reactor chamber. An extension pipe 2¼ inches in diameter of 0.062 inch 310 SS was welded to the shell at the exit hole of the reactor shell and provided with a flange adapted to exhaust pipe connection. A 2 inch diameter × 0.062 inch 310 SS tube was fixed inside the extension pipe flush with the shell interior and flange.

Four shell-extending inlet tube enclosures, each 4 inches long, were fabricated as a tapered 0.065 inch 310 SS tube having one 1.44 inch diameter end and one 1.70 inch diameter end. Each enclosure was welded at its wide end to the shell at one of the four aligned holes with its axis across the shell axis. The attached enclosures were provided with flanges adapted to mounting on a cylinder bank of a Chevrolet 350 cubic inch displacement V-8 engine.

Four inlet tubes as schematically shown in FIGS. 4 and 5 were fabricated each as follows: A 5¾ inch length of 1.305 inch O.D. × 0.065 inch 310 SS tube was closed at one end by a plate welded in it. Starting ⅜ from the closed end, a ⅝ inch wide slot was cut 2 1/16 inches along the tube. A 4¾ inch strip of 9/16 × 0.065 inch 310 SS was bent into a U-shaped insert 2 1/16 inches long having 9/16 inch wide faces ½ inch apart. The U was welded flush with the outer tube surface, with the cross of the U toward the closed end and the U-spacing open to the outside and inside of the tube.

An inlet tube was inserted through each inlet tube enclosure into the reactor tube so that its slot straddled the reactor tube axis. The tube was twisted until the face of its insert aligned 30° from the reactor tube axis, away from the baffle side and toward the far end of the reactor tube and fixed in that alignment.

EXAMPLE 1

Two reactors made as described above were substituted in place of exhaust manifolds on four-cylinder banks of a 1969 Chevrolet 350 V-8 having an engine-driven positive displacement air pump provided by the manufacturer which jets air (for premixing) against engine exhaust valves through ¼ inch diameter openings. Auxiliary air to the reactor was provided by attaching an additional air feed hose to the air output of the same air pump.

The vehicle with the above reactors designated (A) was operated as Example 1 on a chassis dynamometer to determine hydrocarbon and carbon monoxide emissions while simulating an average 7.5 mile trip in an urban area. The testing procedure is defined in Federal Register, Vol. 36, No. 128 — Friday, July 2, 1971, pages 12661 to 12663. The procedure involves determining emissions in cold start "transient" (CST), cold start "stabilized" (CSS) and hot start "transient" (HST) phases of vehicle operation.

CST phase covers 505 seconds which include startup of a light duty vehicle which has been turned off for at least a 12-hour period at ambient temperature, idling and vehicle operation in a dynamometer driving pattern as prescribed in the above procedure. Vehicle emissions during this time are measured.

CSS phase covers 505 seconds continued after CST phase, during which emissions are separately measured. It includes a dynamometer driving pattern, shutdown and shutoff as also prescribed in the above procedure.

HST phase covers a part of vehicle operation initiated 9–11 minutes after CSS phase. Its dynamometer driving pattern repeats CST phase procedure and emissions of the same pattern are measured as also prescribed in the above procedure.

Emissions of each test phase were weighted, in accordance with the Federal Register test above cited, to provide a composite emission per mile value based on $(0.43\ G_{CST} + 0.57\ G_{GST} + G_{CSS})$ as 7.5 miles of emissions where G is the measured emission of a gas being measured in phases designated by subscripts already described.

The vehicle was also operated in other Examples by the same procedure after the following changes were made in its exhaust system:

EXAMPLE 2

Reactor (A) was covered with ½ inch Cerrafelt fibrous insulation on the end plates, shell tube and outward extensions of the inlet tubes and outlet pipe. Two such reactors were substituted for the exhaust manifolds and auxiliary air was provided in the manner of Example 1.

EXAMPLE 3

Reactors used in Example 2 were substituted for the exhaust manifolds, a 48 inch long 2¼ inch O.D. exhaust pipe covered with ½ inch of insulation was substituted for the manufacturer's exhaust pipe and auxiliary air was provided in the manner of Example 1.

EXAMPLE 4

(For Comparative Purposes)

Two prior art reactors, each having a single 1-inch diameter circular bypass hole were installed in place of the exhaust manifolds of the car and all air from the air pump was directed to engine exhaust valves in the manner provided by the engine manufacturer. The prior art reactors were made according to the teaching of Example 1 of coassigned U.S. Pat. No. 3,633,368, and had no auxiliary air inlets.

Table 1 below shows measured emissions (cold start transient, CST; hot start transient, HST: and cold start stabilized, CSS) for hydrocarbons and carbon monoxide as well as the composite value for vehicle mile.

TABLE 1

EXHAUST GAS REACTOR EMISSIONS
Hydrocarbon Emissions, gm.

| Example | CST Phase | HST Phase | CSS Phase | Per Mi. Composite |
| --- | --- | --- | --- | --- |
| 1 | 0.48 | 0.21 | 0.10 | 0.06 |
| 2 | 0.46 | 0.09 | 0.05 | 0.04 |
| 3 | 0.74 | 0.15 | 0.18 | 0.08 |
| 4 | 0.80 | 0.38 | 0.16 | 0.10 |

TABLE 1-Continued

EXHAUST GAS REACTOR EMISSIONS
Carbon Monoxide Emissions, gm.

| Example | CST Phase | HST Phase | CSS Phase | Per Mi. Composite |
| --- | --- | --- | --- | --- |
| 1 | 58.80 | 18.99 | 12.17 | 6.44 |
| 2 | 47.25 | 17.95 | 6.11 | 4.89 |
| 3 | 48.63 | 6.53 | 3.53 | 3.76 |
| 4 | 47.33 | 24.02 | 22.41 | 7.53 |

Performance of Reactor Variations

Variations of pairs of reactor (A) were fabricated as described below:

EXAMPLE 5

Figure 6:
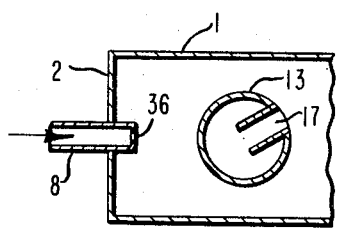
FIGS. 6 through 13 depict alternate configurations of the sectioned end of the reactor of FIG. 1, showing various air inlet configurations.
Figure 7:
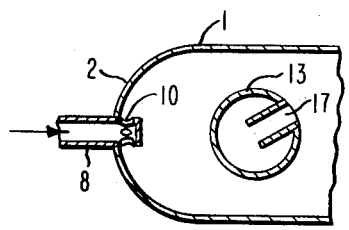

Each reactor was made like reactor (A) except that no frustums were provided in the chamber plates and the pins in the shell end plates were provided with single axial 3/16 inch diameter openings instead of radial holes. FIG. 6 illustrates this structure.

EXAMPLE 6

Figure 8:
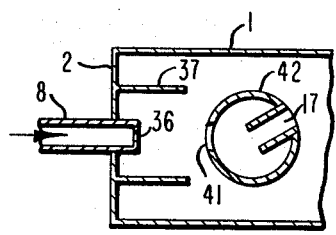

Each reactor was made like reactor (A) except that steel tube segments 1 inch long and 1½ inch O.D. were secured to the chamber plates instead of the frustums, axial 3/16 inch diameter openings into the chamber instead of radial holes were provided in the pins and the outermost inlet tubes were also each provided with a ½ inch diameter hole on the side away from its vaned outlet and centered on the chamber tube axis. FIG. 8 illustrates the arrangement.

EXAMPLE 7

Each reactor was made like reactor (A) except that steel tube segments 1 inch long and 1½ inch O.D. were secured to the chamber plates instead of frustums, axial 3/16 inch diameter openings into the chamber instead of radial holes were provided in the pins and the outermost inlet ducts were 1.3 inch O.D. stainless steel tube having 90° elbows welded to their ends inside and coaxial with the chamber and facing the pin openings instead of corresponding ducts of reactor (A). FIG. 12 shows the arrangement.

EXAMPLE 8

Figure 9:
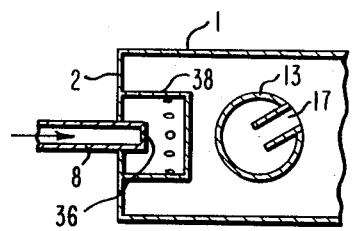

Each reactor was made like reactor (A) except that coaxial cylindrical boxes 1 inch deep and 1½ inch diameter were secured to the chamber plates instead of frustums, a ring of 16, 1/16 inch diameter radial holes was provided in the box periphery and axial 3/16 inch diameter openings into the chamber instead of radial holes were provided in the pins. FIG. 9 shows the arrangement.

EXAMPLE 9

Each reactor was made like reactor (A) except that coaxial cylindrical boxes 1 inch deep and 1½ inch diameter, each having a ⅜ inch wide 45° conic surface joining the box end and periphery and a ring of 16, 1/16 inch diameter holes normal to the conic surface, were secured to the chamber plates instead of the frustums and axial 3/16 inch diameter openings instead of radial holes were provided in the pins. FIG. 10 illustrates the arrangement.

EXAMPLE 10

Each reactor was made like reactor (A) except for changes indicated by FIG. 11. The frustums were omitted. A ½ inch O.D. stainless stseel tube (41) an inch shorter than the chamber tube was provided with four ½ inch slots, each 1/16 inch wide and having a central ½ inch diameter hole in a location intended to oppose an inlet duct opening. Plenum circular plates (40), each having a ½ inch diameter hole tangent to its diameter, are fixed inside the chamber ¾ inch from the chamber plates so that the ½ inch tube fits into their holes and has its slots aligned as intended.

Pairs of these reactors were substituted for the exhaust manifold of the same car and tested by the same procedure as in Examples 1 to 4. Auxiliary air was provided as in Example 1. Table 2 shows the composite grams per mile emission of hydrocarbons and carbon monoxide using each reactor.

TABLE 2

EXHAUST EMISSIONS OF VARIED REACTORS
Composite gm/mile Emission

| Example No. | Hydrocarbon | Carbon monoxide |
|---|---|---|
| 5 | 0.09 | 5.15 |
| 6 | 0.07 | 4.24 |
| 7 | 0.06 | 5.84 |
| 8 | 0.05 | 5.00 |
| 9 | 0.04 | 5.72 |
| 10 | 0.10 | 6.72 |

EXAMPLE 11

A reactor was constructed representing the embodiment of FIG. 3. It used a 17-inch long chamber reaction tube of 4 inch O.D. stainless steel tube coaxially positioned inside a 5-inch O.D. stainless steel tube and partially spheric end plates on both the chamber and shell tubes. Central pins used were identical to those used for the reactor of Example 1. Inlet tubes were like those fabricated for Example 1 and arranged 30° from the chamber axis in directions shown by FIG. 3. The exit pipe was 4.25 inches from the chamber midpoint, was of 2 inch diameter, and extended across the chamber axis from flush with the chamber exterior to one inch from the chamber wall. Shell extensions with flanges were provided around the inlet pipes in a manner which extended the air space between the pipes and extensions. A shell extension was provided on the shell aligned with the exit pipe, and a 2½ inch diameter exit pipe extension was fixed inside the shell extension with air gap-maintaining spacer rings around it. A flange was fixed on the shell extension. The entire assembly was covered with fibrous insulation material.

Two such reactors were substituted for the exhaust manifolds of a 1971 Chevrolet 350 V-8 equipped like the car provided for Example 1. Auxiliary air to the reactor was provided by attaching an additional air fed hose to the air output of the same pump. The emissions test showed 0.12 gm. per mile composite hydrocarbon and 3.08 gm. per mile composite carbon monoxide emissions.

The embodiments of the invention are defined as follows:

1. In a thermal exhaust gas reactor comprising an elongated reactor chamber having walls, ends and a longitudinal axis, and an outer shell enclosing the reactor chamber and separated therefrom by an insulation space, the reactor chamber being enclosed except for exhaust gas inlets, and a reaction-product outlet, the improvement which comprises
    i. air inlets, at both chamber ends, separate from the exhaust gas inlets, and
    ii. at least one of said exhaust gas inlets extending into the reactor chamber as a pipe closed at the end which extends into the reactor chamber except for an axial slot, said pipe having guide vanes therein flush with the axial slot, at least one of the vanes being positioned to change the direction of the flow of exhaust gas from axial to cross-axial flow.

2. A reactor according to claim 1 wherein each of said exhaust gas inlets has at least one opening into the chamber of total inches perimeter $p$ and of total square inches $a$ and wherein the ratio $p/a$ is at least 3.

3. A reactor according to claim 2 wherein the $p/a$ ratio is in the range 4 to 5.

4. A reactor according to claim 1 wherein the exhaust gas inlet openings into the chamber are canted at 0° to 60° to the chamber axis.

* * * * *